May 14, 1968 A. HÜRLIMANN 3,383,523

MODULATOR CIRCUIT FOR PULSE-MODULATED MAGNETRON TRANSMITTERS

Filed Jan. 28, 1965

INVENTOR
ARMIN HÜRLIMANN
By McGlew and Toren
ATTORNEYS 3,383,523

MODULATOR CIRCUIT FOR PULSE-MODULATED MAGNETRON TRANSMITTERS

Armin Hürlimann, Schlieren, Switzerland, assignor to Albiswerk Zurich A.G., Zurich, Switzerland Filed Jan. 28, 1965, Ser. No. 428,683
Claims priority, application Switzerland, Mar. 4, 1964, 2,738/64
6 Claims. (Cl. 307—265)

ABSTRACT OF THE DISCLOSURE

The disclosure relates to pulse-modulated magnetron transmitters, such as used for transponder and responder beacons, and in which a thyratron controls the magnetron tube through a pulse-forming network, and a pulse transformer is controlled by a blocking oscillator through a pulse amplifier. Such modulators frequently have the disadvantage that the thyratron is caused to conduct permanently, by disturbances occurring during charging time of the pulse-forming network, due to the fact that the recovery time of the thyratrons is not negligibly small so that, upon occurrence of disturbing pulse during charging of the pulse forming network, the charging current maintains the thyratron in a conductive state.

Figure 1:
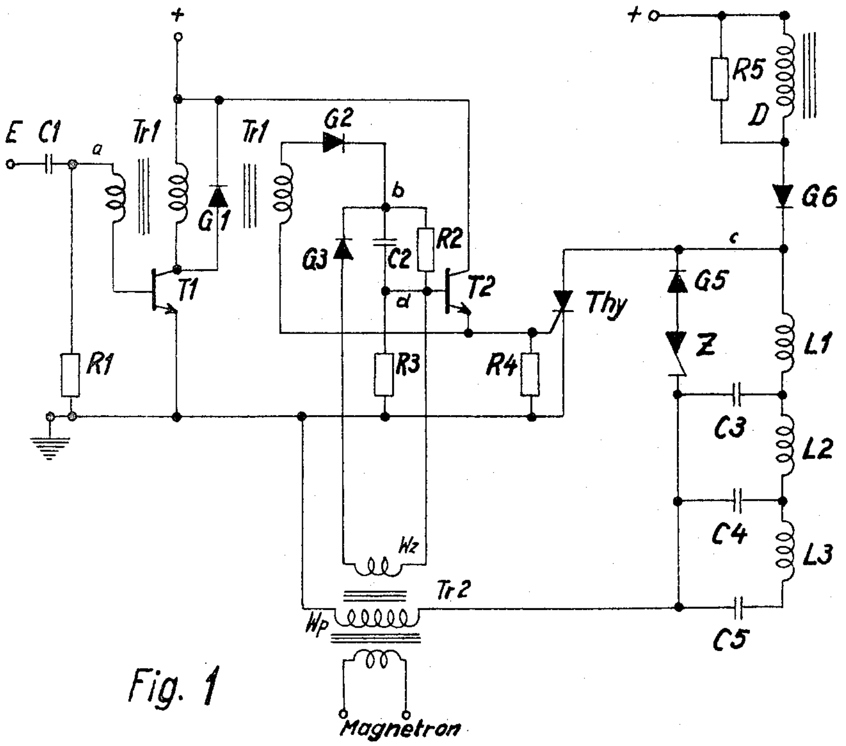

In accordance with the disclosure, such permanent conduction of a thyratron in such a modulator is prevented by providing a gate circuit including means determining the blocking time, this gate circuit being between the blocking oscillator and the pulse amplifier. The means determining the blocking time is charged by pulses from an additional winding of the pulse transformer, after each pulse. By way of example, the gate circuit may comprise the series combination of a diode and a resistance, blocked by a condenser, with the pulses for blocking of the gate circuit being supplied to the condenser through another diode. The pulse-forming network preferably is fed through a saturated iron choke, and a series connection of a diode and a Zener diode, of opposite polarity, is connected in parallel with the pulse-forming network.

BACKGROUND OF THE INVENTION

This invention relates to modulator circuits for pulse-modulated magnetron transmitters, such as used in transponders and responders, and more particularly to a novel modulator circuit of this type whereby permanent or continuous conduction of a thyratron is prevented in an inexpensive manner.

In modulator circuits of the type to which the present invention is directed, a thyratron controls a magnetron through a pulse-forming network and a pulse transformer. This thyratron is controlled by a blocking oscillator through a pulse amplifier.

Modulators of this type have the disadvantage that the thyratron may be caused to conduct continuously or permanently, a condition known as "continuous ignition," by disturbances which occur during the charging time of the pulse-forming network. This is due to the fact that the recovery time of thyratrons is not negligibly small, and must be taken into account. Thus, if a disturbance pulse occurs during charging of the pulse forming network, the charging current maintains the thyratron in the conductive state.

In "Electronics" for February 1962, pages 44–46, it has been proposed to block a semi-conductor thyratron, during the charging time of the pulse-forming network, by means of an additional blocking circuit. This is effected by utilizing the charging current for the pulse-forming network to induce a voltage in a transformer. The negative half-wave is then retarded inductively and with the input resistance of the semi-conductor thyratron, and is lengthened or extended with a Zener diode. By the use of this additional, and relatively costly, blocking circuit, it is assured that disturbance pulses cannot make the semi-conductor thyratron conductive during the charging time of the pulse-forming network.

It is known that, due to misadaptation, or mismatching, of the magnetron to the modulator circuit, and as a result of the magnetization energy again released in the pulse transformer, a negative potential is built-up in the pulse-forming network. Despite the resulting negative voltage which is applied to the anode of the thyratron, and which decreases the recovery time of the latter, at high pulse repeat frequencies the available time still may not be sufficient for the recovery of the semi-conductor thyratron, and thus continuous conduction or ignition of the thyratron may take place.

An object of the present invention is to provide a modulator circuit for pulse-modulated magnetron transmitters in which permanent conduction of a thyratron is effectively prevented at a very low cost.

Another object of the invention is to provide, in a modulator circuit for pulse modulated magnetron transmitters, a novel method for preventing continuous conduction of a thyratron.

A further object of the invention is to provide a modulator circuit for pulse-modulated magnetron transmitters in which the combination of a gate circuit and a time determining means is provided between a blocking oscillator and a pulse amplifier to block transmission of output pulses from the blocking oscillator to the pulse amplifier for a time at least equal to the charging time of the pulse forming network.

Still another object of the invention is to provide a modulator circuit as just mentioned in which the time determining means is charged by pulses from a supplementary winding of a pulse transformer and after each pulse applied to the input winding of the transformer from the pulse forming network.

Yet another object of the invention is to provide a modulator circuit for a pulse-modulated magnetron transmitter, including a pulse-forming network, and novel means for decreasing the charging time of the pulse forming network.

In accordance with the foregoing objects, the modulator circuit of the present invention includes the combination of a gate circuit and a time determining member or means which conjointly determine the time duration of blocking of output pulses from the blocking oscillator applied to the pulse amplifier. The time determining means is charged by pulses from a supplementary winding of the pulse transformer which, in turn, is energized by pulses from a pulse forming network. The gate circuit may comprise, for example, a diode and a resistance in series therewith, this series combination being blocked with a condenser and the pulses for blocking of the gate being supplied to the condenser through another diode.

To reduce the charging time of the pulse-forming network, the latter is preferably supplied with potential through a saturated iron choke. A further feature is the provision of a series connection of a diode and a Zener diode, which are oppositely poled, in parallel with the pulse-forming network.

For an understanding of the principles of the invention, reference is made to the following description of a typical embodiment thereof as illustrated in the accompanying drawings.

In the drawings:

FIG. 1 is a schematic wiring diagram of a modulator circuit, for pulse-modulated magnetron transmitters, embodying the invention; and FIG. 2*a*–2*d* are curves illustrating the pulse voltages at selected points in the schematic circuit of FIG. 1.

Referring to FIG. 1, a condenser C1 in combination with a resistance R1 forms differentiating means for transmitting triggering input pulses applied to an input terminal E. A blocking oscillator has its input circuit connected to the differentiating means at point *a* and, in the specific embodiment chosen for illustration, the blocking oscillator comprises a transistor T1, a transformer T*r*1 and a diode G1. Transistor T1 is connected in an emitter-base configuration, and is illustrated as an NPN transistor. Transformer T*r*1 is illustrated as having three windings, and the operating potential for the blocking oscillator is applied from the positive terminal of a suitable source of D.C. potential. The emitter of transistor T1 is connected to ground as is also one terminal of the resistance R1.

The gate circuit comprises two diodes, G2 and G3, as well as time determining means comprising a condenser C2 and a resistance R2. Diodes G2 and G3 are connected at a junction point *b* to the common connection of condenser C2 and resistance R2. The output pulses of the blocking oscillator are applied to a pulse amplifier through the gating circuit, which is illustrated as having its input connected, at junction points *d* to the condenser C2 and the resistance R2. This pulse amplifier is illustrated as a transistor T2 which is connected in an emitter-follower configuration. The base of transistor T2 is connected, through junction points *d* and resistance R3, to ground.

The pulse-forming network comprises inductances L1, L2, and L3, and associated condensers C3, C4 and C5. In parallel with this pulse-forming network, there is provided a series connection of a diode G5 and a Zener diode Z, which are connected in opposition or which are oppositely poled. The pulse-forming network is supplied with potential, from the positive terminal of a source D.C. potential, through a diode G6 in series with a saturated iron core choke D with which a resistance R5 is connected in parallel. The cathode of the magnetron tube is connected to the secondary winding of a transformer T*r*2.

The pulse-forming network is triggered by the thyratron T*hy* which is illustrated as a solid state thyratron such as, for example, a silicon controlled rectifier. A resistance R4 is connected across the gating or control circuit of the thyratron T*hy*. Transformer T*r*2 is provided further with a primary winding W*p* and a supplementary winding Wz.

Figure 2:
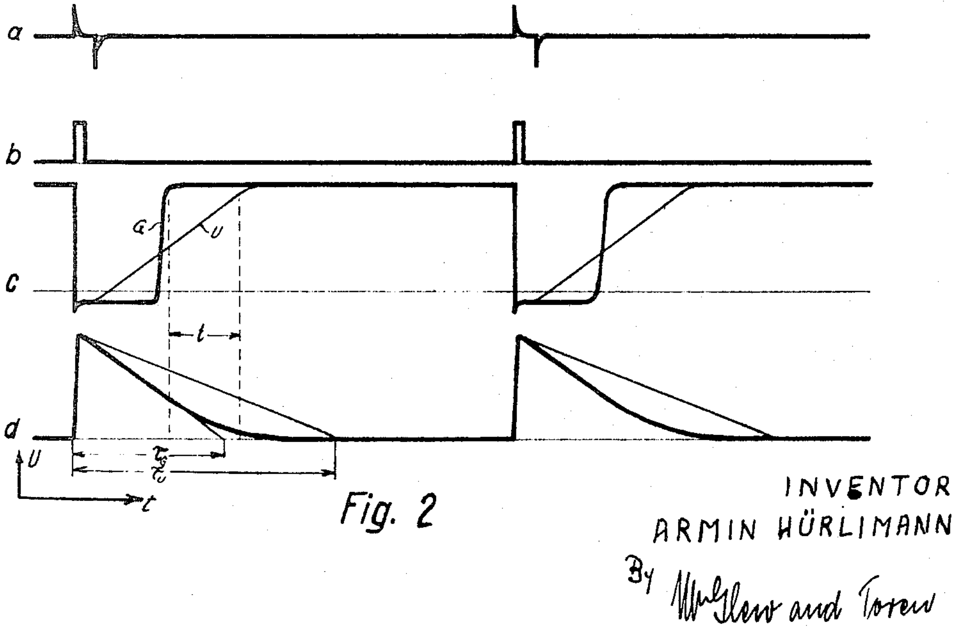

The transmission triggering pulses applied to input terminal E are differentiated by differentiating means C1, R1 to provide, at junction point *a*, pulses such as illustrated in FIG. 2*a*. The blocking oscillator is triggered with the positive differentiated pulse derived from the leading edge of the transmission triggering pulse. This blocking oscillator furnishes, at its output, pulses which are defined in amplitude and length, as illustrated in FIG. 2*b*. Through the diode G2 and the condenser C2, the blocking oscillator output pulses are applied to the base of transistor T2. Thereby a current having the form of the blocking oscillator pulse flows through the collector and emitter of transistor T2. This current produces, across the resistance R4, the control voltage for the semi-conductor thrytron T*hy*. The charge of the pulse-forming network, thus triggered by the thyratron, is conducted by the semi-conductor thyratron T*hy* through the primary winding W*p* of pulse transformer T*r*2. This charge produces, at the input of pulse transformer T*r*2, the high voltage pulse for the magnetron.

As a result of the application of the pulse from the pulse forming network to the transformer T*r*2, a voltage is induced in supplementary winding Wz of pulse transformer T*r*2. The positive half-wave of this voltage charges condenser C2 through diode G3. The charge of condenser C2 is dissipated or leaked off through resistance R2, as illustrated in FIG. 2*d*. By suitable selection and rating of supplementary winding Wz, of condenser C2 and of resistance R2, the effect may be attained that diode G2 is blocked for output pulses from the blocking oscillator. The charge applied to condenser C2 by supplementary winding Wz must be such that, at junction point *b*, there is a voltage, with respect to ground, which has a magnitude or amplitude at least as great as the voltage amplitude or magnitude of the output pulses from the blocking oscillator. Resistance R2 must be chosen or rated that the time $\tau$ of the discharge of condenser C2 is at least as great as the recovery time of semi-conductor thyratron T*hy*, on the one hand, and the charging time of the pulse-forming network on the other hand. After this period of time, the voltage point *b* is reduced to a value such that the output pulses from the blocking oscillator can now again be applied to the base of transistor T2.

By the described arrangement, the output pulses from the blocking oscillator are prevented from reaching the pulse amplifier T2 for a time interval at least equal to the recovery time of thyratron T*hy* and the charging time of the pulse forming network. Thus, no spurious pulses can effect charging of thyratron T*hy* during this pulse blocking time.

A negative charge is produced by the return current in the pulse-forming network, by the reflection due to mismatching or misadaptation to the magnetron and by the magnetic energy released in pulse transformer T*r*2. This negative charge is desirable in that it shortens the recovery time of the semi-conductor thyratron. However, if this return current were conducted entirely to the pulse forming network, a very high negative potential might appear at the anode of the thyratron after some charging operations. In order to prevent this happening, a diode G5, whose threshold voltage is raised to a selected value by a Zener diode Z in series with it and oppositely poled, is connected in parallel with the pulse forming network and serves to remove part of the negative charge due to the return current in the pulse-forming network.

To shorten the charging time of the pulse-forming network, an iron core choke D, which is saturated at relatively small currents, may be connected in series in the potential supply line of the pulse forming network. Thus, before the charging of the pulse forming network can begin, magnetic energy must be provided in the iron core of choke D, thereby delaying the beginning of charging of the pulse forming network. After such saturation of choke D, its inductance decreases to a very small value and the charging of the pulse-forming network can take place very quickly.

The difference between the charging time with an unsaturated iron core choke and the charging time with the saturated iron core choke is illustrated graphically in FIG. 2*c*. Curve U represents the charging time with an unsaturated iron core choke, and curve G represents the charging time with a saturated iron core choke. It will be noted that the difference between the charging time with the curve G and that with the curve U is a time differential *t*, before the transmitter is triggered. By referference to FIG. 2*d*, it will be noted that the time constant provided by the resistance R2 need have a value $\tau_G$ when the pulse-forming network is charged with a saturated iron core choke, whereas a resistance having a much larger time constant $\tau_U$ is required if the pulse-forming network is charged through an unsaturated iron core choke.

As diode G6 prevents dissipation of the magnetization energy remaining after charging of the pulse forming network, undesired natural oscillations may result due to the self-inductance and self-capacity. These undesired natural oscillations are dampened by resistance R5 connected in parallel with saturated iron core choke D.

While a specific embodiment of the invention has been shown and described in detail to illustrate the application of the principles of the invention, it will be understood that the invention may be embodied otherwise without departing from such principles.

What is claimed is:

1. A modulator circuit for pulse-modulated magnetron transmitters comprising, in combination, a thyratron; pulse-forming means in circuit connection with said thyratron; a pulse transformer having an input winding connected to said thyratron and to said pulse forming means, and an output winding connected to control the magnetron transmitter; a blocking oscillator; means for applying triggering pulses to said blocking oscillator to produce output pulses from the latter; a pulse amplifier connected at a junction point to said blocking oscillator and controlling said thyratron responsive to said oscillator output pulses to energize said pulse-forming means to apply a pulse to said input winding; and a gating means and time determining means, connected to said junction point and to said transformer, and operable, responsive to application of a pulse from said pulse-forming means to said input winding, to apply to said point a pulse blocking potential having an amplitude at least equal to that of said blocking oscillator output pulses for a time, as determined by said time determining means, at least equal to the recovery time of said thyratron.

2. A modulator circuit for pulse-modulated magnetron transmitters, as claimed in claim 1, in which said thyratron is a solid state thyratron.

3. A modulator circuit for pulse-modulated magnetron transmitters, as claimed in claim 2, in which said pulse-forming means is a pulse-forming network in circuit connection with said thyratron; said pulse transformer having a supplementary winding; said gating means including time determining means, connected to said junction point and to said supplementary winding; said time determining means including a condenser and resistance combination, the condenser being charged from said supplementary winding through said gating circuit and discharging through said resistance.

4. A modulator circuit for pulse-modulated magnetron transmitters, as claimed in claim 2, in which said pulse-forming means comprises a pulse-forming network in circuit connection with said thyratron; said pulse transformer having a supplementary winding; said gating means comprising a gating circuit, including a diode and a blocked resistance connected in series between said output of said blocking oscillator and the input of said pulse amplifier; time determining means in circuit connection with said gating circuit; a diode connected between said supplementary winding and said gate circuit and said time determining means and operable, responsive to application of a pulse from said pulse-forming network to said input winding, to apply to said gating circuit a blocking potential having an amplitude at least equal to that of said blocking oscillator output pulses for a time, as determined by said time determining means, at least equal to the recovery time of said thyratron; a supply terminal for said pulse-forming network; and a saturated iron core choke connected between said supply terminal and said pulse forming network.

5. A modulator circuit for pulse-modulated magnetron transmitters, as claimed in claim 4, including a blocking oscillator; means for applying triggering pulses to said blocking oscillator to produce output pulses from the latter; a pulse amplifier controlling said thyratron, responsive to said oscillator output pulses, to energize said pulse-forming network to apply a pulse to said input winding; a gating circuit; including a diode and a blocked resistance connected in series between said output of said blocking oscillator and the input of said pulse amplifier; time determining means in circuit connection with said gating circuit; a diode connected between said supplementary winding and said gate circuit and said time determining means and operable, responsive to application of a pulse from said pulse-forming network to said input winding, to apply to said gating circuit a blocking potential having an amplitude at least equal to that of said blocking oscillator output pulses for a time, as determined by said time determining means, at least equal to the recovery time of said thyratron and the charging time of said pulse-forming network; a supply terminal for said pulse-forming network; a saturated iron core choke connected between said supply terminal and said diode connected between said saturated iron core choke and said pulse-forming network.

6. A modulator circuit for pulse-modulated magnetron, as claimed in claim 5, including a resistance connected in parallel with said saturated iron core choke.

References Cited

UNITED STATES PATENTS

| | | | |
|---|---|---|---|
| 2,815,445 | 12/1957 | Young et al. | 331—87 X |
| 2,946,958 | 7/1960 | Bonia et al. | 331—87 X |
| 2,955,263 | 10/1960 | Hobrough | 328—65 X |
| 3,227,994 | 9/1965 | Theodore et al. | 328—67 |

ALFRED L. BRODY, *Primary Examiner.*